Dec. 28, 1948.    W. W. WESNER    2,457,761
IRRADIATION OF LIQUIDS USING ULTRAVIOLET LIGHT
Filed Dec. 8, 1944    2 Sheets-Sheet 1

Inventor
Wilton W. Wesner,
By J. Stuart Freeman
Attorney

Dec. 28, 1948.  W. W. WESNER  2,457,761
IRRADIATION OF LIQUIDS USING ULTRAVIOLET LIGHT
Filed Dec. 8, 1944  2 Sheets-Sheet 2

Inventor
Wilton W. Wesner,
By J. Stuart Freeman,
Attorney

Patented Dec. 28, 1948

2,457,761

UNITED STATES PATENT OFFICE 2,457,761

IRRADIATION OF LIQUIDS USING ULTRAVIOLET LIGHT

Wilton W. Wesner, Rancocas, N. J.

Application December 8, 1944, Serial No. 567,237

2 Claims. (Cl. 250—49)

The object of the invention is to provide improvements in irradiating devices, and especially in that class which is employed in the irradiation of milk and other liquids in the enlargement of the vitamin D content, though the principles involved can be adapted to the treatment of many solids, such as granulated or otherwise finely divided cereals, flour and the like, and at the same time completely protecting the substances being treated, so as to prevent oxidation, acquisition of off-tastes and/or other phases of deterioration.

Another object is to provide a device of this character, which, while being adapted to large installations is particularly designed for use on relatively small farms, dairies and manufacturing establishments where a portable device is desired. In such places, especially where milk is the liquid to be treated, there is an additional advantage in that properly irradiated milk will keep longer, even in the absence of refrigeration.

It is common practice on small farms having no means for refrigerating the milk to place it in the usual large cans beside a nearby highway, there to await collection by truck for transportation to the dairy, where it is both cooled and irradiated. In hot weather especially this milk may have already acquired a too-high bacteria count before it is collected by the truck, as the particular farmer is not equipped with means to combat bacteria, except by water coolers, for retarding to some extent or degree bacteria development while awaiting collection.

By contrast, if the same farmer possesses a relatively small and efficient irradiation apparatus of the construction hereinafter described, he can treat his milk immediately after milking, and thus inhibit souring and/or other form of deterioration by sterilizing, or in other words, arresting growth and multiplication of the lactic acid producing and other organisms, and in fact completely killing and eliminating them all together.

Figure 1:
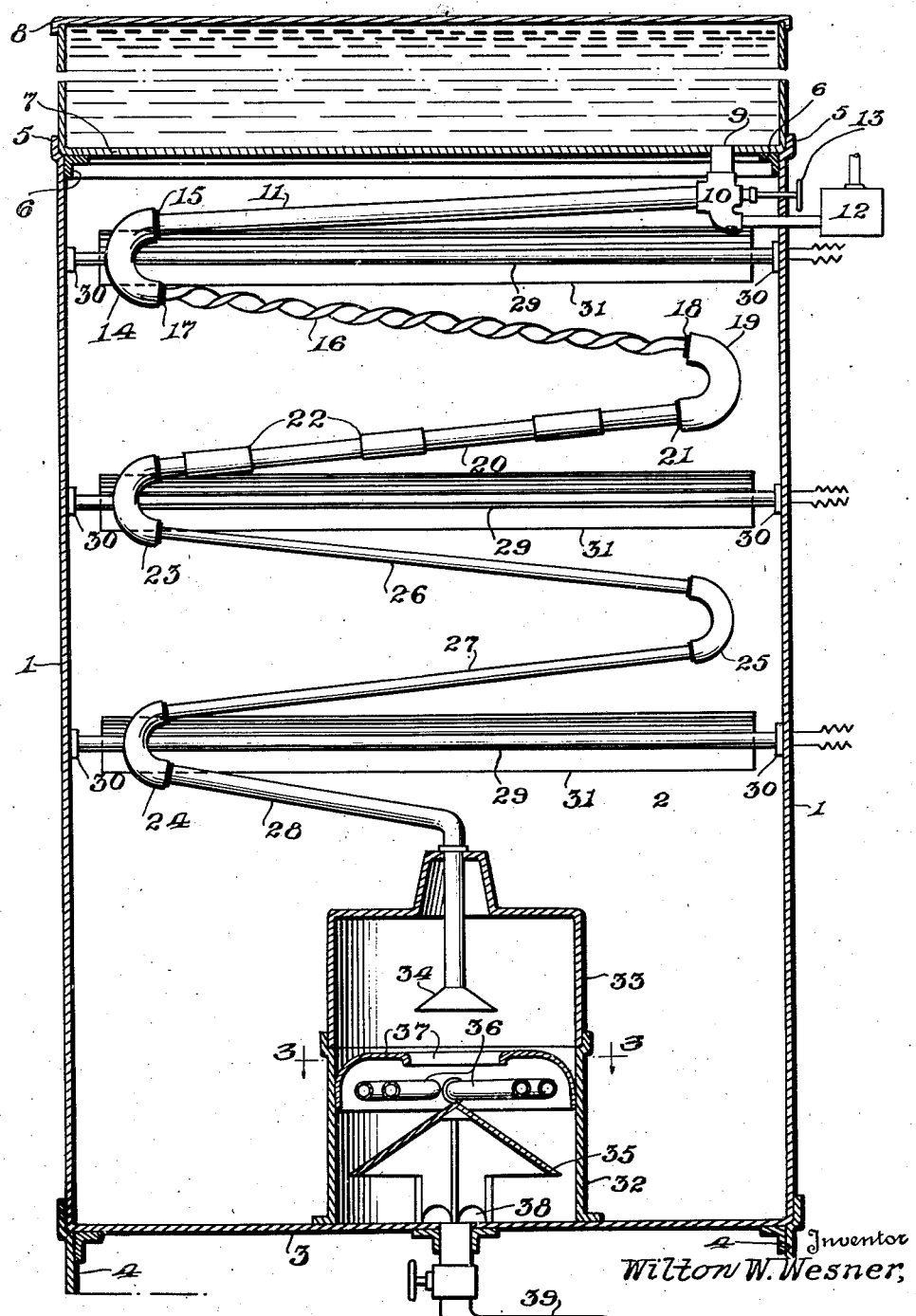
Figure 2:
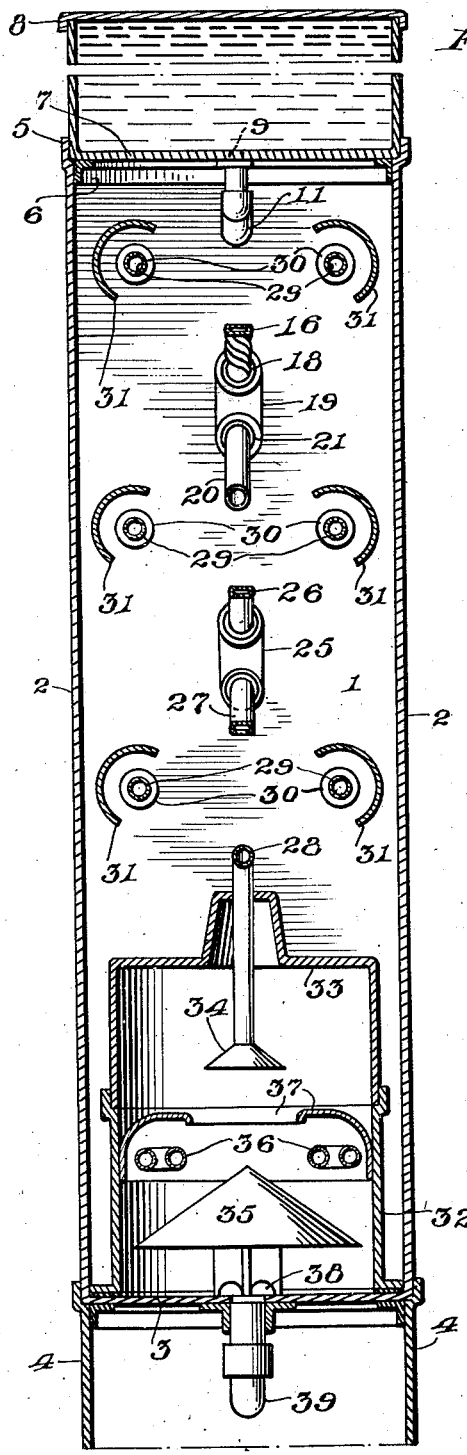
Figure 3:
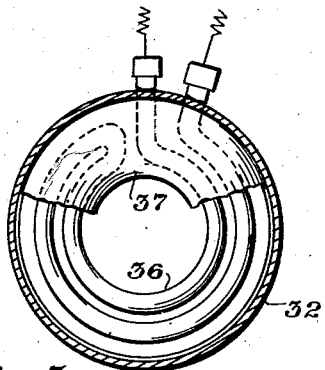
Figure 4:
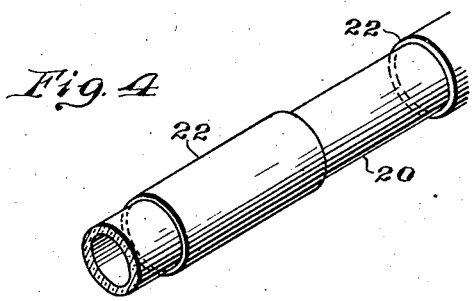
Figure 5:
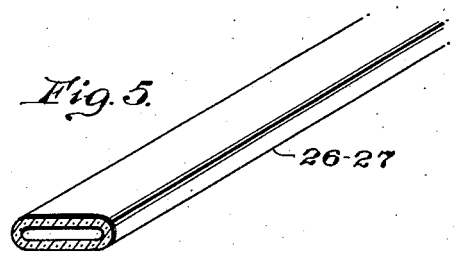

With the objects thus broadly stated, the invention comprises further details of construction and operation, which are hereinafter fully brought out in the following description, when read in conjunction with the accompanying drawings, in which Fig. 1 is a longitudinal vertical section through a device comprising one embodiment of the invention; Fig. 2 is a transverse vertical section of the same; Fig. 3 is a horizontal section on the line 3—3 of Fig. 1; and Figs. 4 and 5 are enlarged, fragmentary, perspective views of liquid-conveying tubes of two cross sectional shapes, flat and cylindrical, respectively.

Referring to the drawings, a sheet metal casing of any desired shape is shown as comprising end and side walls 1 and 2, and a bottom wall 3, said casing as a whole being supported by legs 4, representing either fixed or portable supporting means. The upper edge portions of the end and side walls are flared outwardly to provide a peripheral flange 5, within which is positioned a peripheral angle or series of spaced brackets 6. Resting upon said angle or bracket and restrained against transverse shifting in a horizontal direction by said flange, is a demountable receptacle 7 having a removable cover 8, representing any suitable reservoir into which quantities of a liquid may be poured, and from which such liquid can flow by gravity through an outlet 9, controlled by a valve 10.

Leading from said valve, and slanting slightly downwardly and across the interior of said casing, is a cylindrical tube 11 of glass or other suitable transparent substance, such as one of the light-passing synthetic resins. If said valve is of the two-way variety, it may selectively connect said tube either to said reservoir or to a different source of supply (not shown) through a pressure pump 12, said valve preferably being adjacent to one of the casing walls 1, through which it is accessible by manual actuation of the hand wheel 13 upon the outside thereof.

The opposite casing wall is provided upon its inner surface with a suitable U-bend 14, which may be metallic and opaque or of transparent material instead. In either case the tube 11 enters said U-bend through a gasket seal 15, while a second transparent tube 16 leaves the lower portion of said U-bend through a second gasket seal 17. This latter tube may also be cylindrical or may be of flattened cross section and twisted spirally as shown. In any case it leads through an upper gasket-sealed opening 18 in a second U-bend 19, similar to said first U-bend, while a third transparent tube 20 leaves said second U-bend through a lower gasket-sealed opening 21. This last-mentioned tube may be of uninterrupted transparency, or may be composed of spaced opaque portions, coated with black or other paint, or with adjustable sleeves 22 of selected length and spacing. (Figs. 1 and 5).

Beneath the first U-bend are one or more U-bends 23 and 24 of any desired number, while beneath the second U-bend 19 is at least one other such bend 25, while transparent tubes 26 and 27 of flat or other desired cross section continue the zig-zag tube arrangement, until from the lowermost U-bend 24 there leads a tube 28 to an auxiliary irradiating unit. While tubes 16, 20, 26 and 27 have been shown of different shapes, it is to be understood that they may instead be of any one of the shapes illustrated, or otherwise if desired, so that their liquid contents will be subjected to the greatest possible extent to the activating or irradiating effect of rays from a plurality of ultraviolet tubes 29, arranged in pairs and in vertical planes upon the opposite sides of the plane of said liquid-carrying tubes. These light tubes are supported by the end walls of said casing through the medium of sockets 30, while to increase the efficiency of said light tubes suitable reflectors 31 are so positioned as to direct the greatest possible amount of light rays towards said liquid-carrying tubes.

The auxiliary unit above referred to comprises a preferably cylindrical base portion 32, which may rest upon the bottom wall 3 of said casing, or be supported above and freely removable therefrom. It is provided with a detachable cover 33, through the top of which extends the lower end portion of the tube 28, which at its end carries a spray nozzle 34. Liquid emitted from said nozzle falls directly upon a conical member 35, where it is again subjected to activating rays from concentric coils of ultra-violet light tubes 36, or drips upon said conical member after first falling upon an annular shield or canopy 37, positioned above and operative to protect and prevent liquid from falling upon the concentric light tubes 36. From the conical member, the irradiated liquid falls and leaves said base portion 32 by way of a drain 38 and discharge pipe 39 connected thereto, whence the liquid can be discharged into cans, barrels, or elsewhere as desired.

To facilitate frequent and thorough cleaning, all of the several parts of the device are preferably readily removable and replaceable. Also, they may be made of glass, synthetic resins or the like, stainless steel and similar non-corrosive alloys, and such other substances as will aid in maintaining a hygienically clean device at all times.

Having thus described by invention, what I claim and desire to protect by Letters Patent of the United States is:

1. Irradiation apparatus comprising a plurality of downwardly sloping transparent rectilinear tubes of flattened cross-section, and at least one of which is spirally twisted, said tubes extending in approximately a common substantially vertical plane to conduct substances therethrough continuously downwardly in a ziz-zag path, U-bends connecting adjacent ends of neighboring tubes, and a plurality of ultra-violet ray lamps upon the opposite sides of said plane.

2. Irradiation apparatus comprising a plurality of light penetrable rectilinear tubes, one above the other, at least one of said tubes being of flattened cross-section and spirally twisted, tubular means connecting the adjacent ends of said tubes to conduct substances therethrough continuously downwardly, and ultra-violet ray lamp means located and disposed to treat the said substance in its passage through the tubes.

WILTON W. WESNER.

REFERENCES CITED

The following references are of record in the file of this patent:

UNITED STATES PATENTS

| Number | Name | Date |
|---|---|---|
| 629,644 | Axtell | July 25, 1899 |
| 1,145,140 | Henri et al | July 6, 1915 |
| 1,204,721 | Recklinghausen | Nov. 14, 1916 |
| 1,473,095 | Henri | Nov. 6, 1923 |
| 1,486,473 | Ailhaud | Mar. 11, 1924 |
| 1,817,936 | Supplee | Aug. 11, 1931 |
| 1,888,472 | Rohde | Nov. 22, 1932 |
| 1,980,971 | Campsie | Nov. 13, 1934 |
| 2,018,332 | Trebler | Oct. 22, 1935 |
| 2,072,417 | Berndt | Mar. 2, 1937 |
| 2,074,909 | Herzig et al | Mar. 23, 1937 |
| 2,309,124 | Knott | Jan. 26, 1943 |
| 2,340,890 | Lang | Feb. 8, 1944 |